(No Model.)  3 Sheets—Sheet 1.

E. FRANZKE.
BICYCLE LOCK.

No. 600,962. Patented Mar. 22, 1898.

Witnesses:
E. B. Bolton
O. B. Uhrick

Inventor:
Ernst Franzke
By Richardson
his Attorneys.

THE NORRIS PETERS CO., PHOTO-LITHO., WASHINGTON, D. C.

(No Model.) 3 Sheets—Sheet 2.

E. FRANZKE.
BICYCLE LOCK.

No. 600,962. Patented Mar. 22, 1898.

Witnesses.
E. B. Botton
[signature]

Inventor:
Ernst Franzke
By [signature]
his Attorneys (No Model.)  3 Sheets—Sheet 3.

E. FRANZKE.
BICYCLE LOCK.

No. 600,962. Patented Mar. 22, 1898.

Witnesses:

Inventor:
Ernst Franzke
By
his Attorneys.

UNITED STATES PATENT OFFICE.

ERNST FRANZKE, OF HANOVER, GERMANY.

BICYCLE-LOCK.

SPECIFICATION forming part of Letters Patent No. 600,962, dated March 22, 1898.

Application filed August 19, 1897. Serial No. 648,743. (No model.)

*To all whom it may concern:*

Be it known that I, ERNST FRANZKE, locksmith, of 4$^b$ Warstrasse, Hanover, in the Empire of Germany, have invented an Improvement in Bicycle-Locks; and I do hereby declare the nature of this invention and in what manner the same is to be performed to be particularly described and ascertained in and by the following statement.

The present invention relates to a cycle-lock adapted to be conveniently operated and effective in its action, the said lock being designed to secure the cycle to which it is applied against theft. For this purpose an arm passes between the spokes of the front wheel or of the rear wheel, according to the arrangement, so as to prevent the turning movement of the said wheel, such arm being so arranged that it can only be liberated by the key, which is in the possession of the cyclist.

The improved lock is represented in the accompanying drawings, in which—

Figure 2:
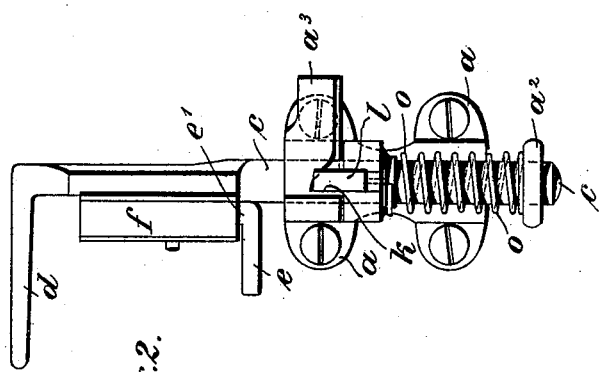
Figure 1:
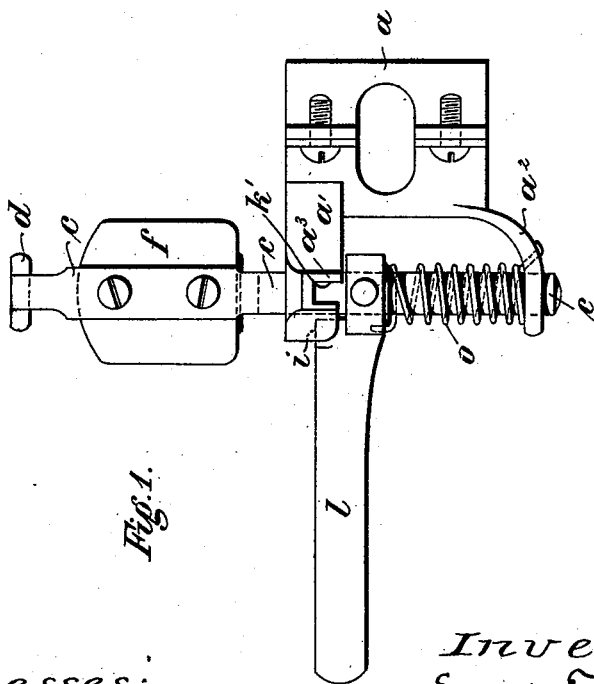
Figure 3:
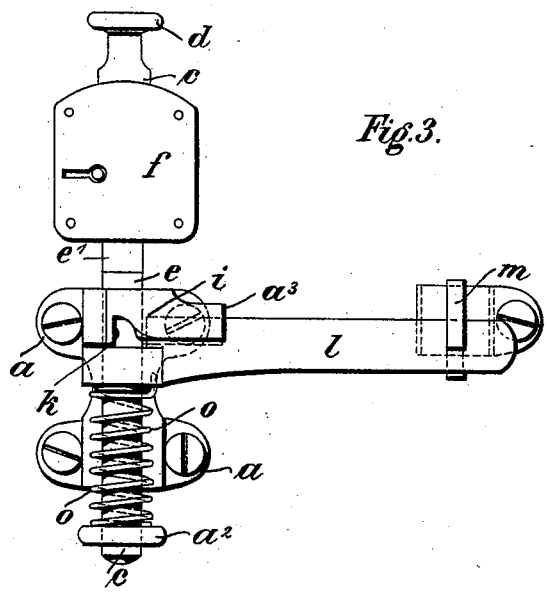
Figure 4:
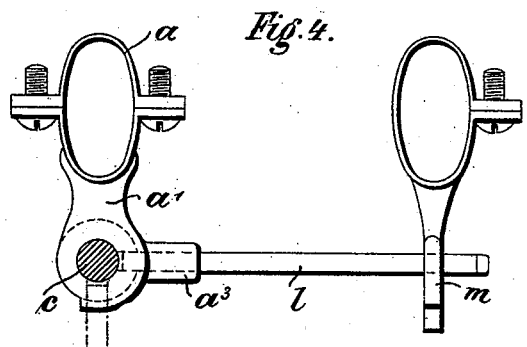
Figure 5:
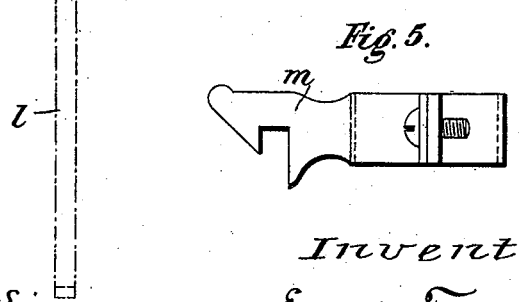
Figure 6:
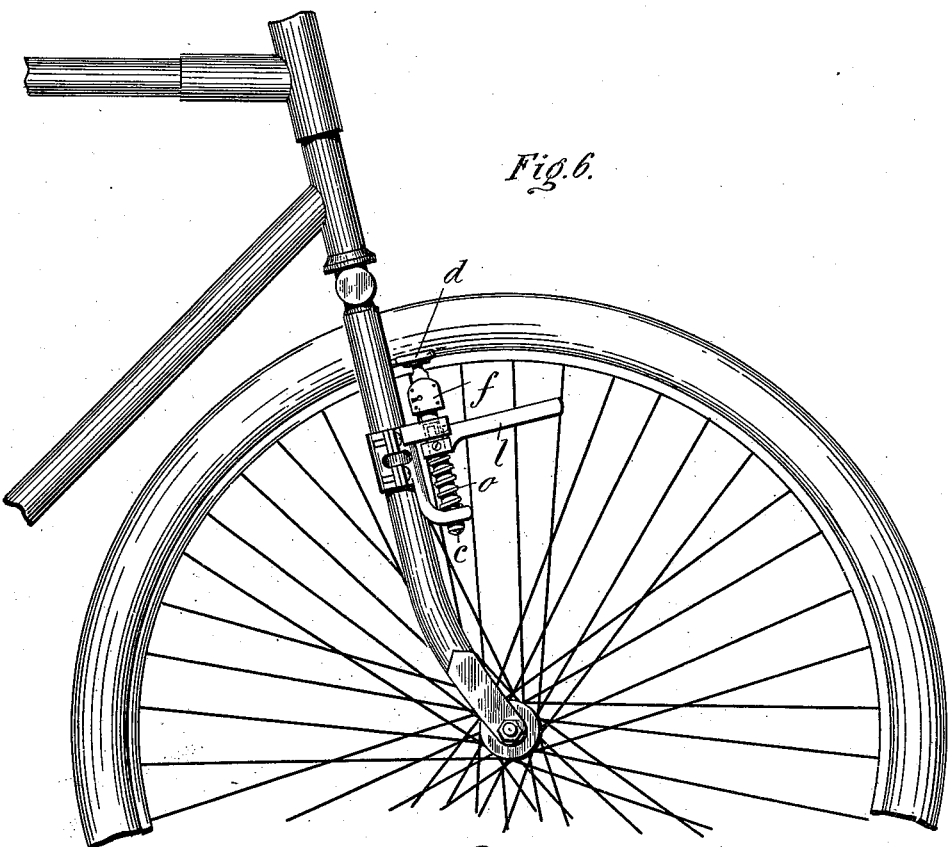
Figure 7:
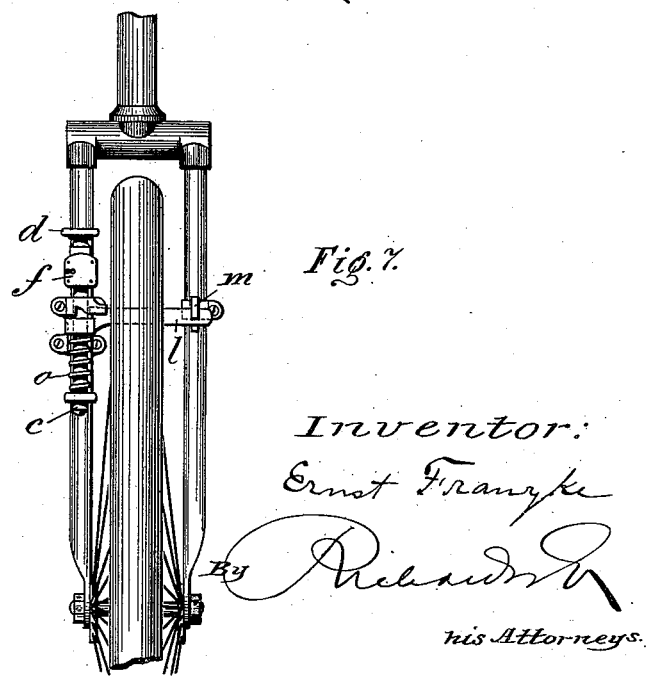

Figure 1 shows the lock in side elevation, the arm being out of action. Fig. 2 shows the corresponding front elevation. Fig. 3 is a similar front elevation, the arm being in the locking position. Fig. 4 is a plan of Fig. 3. Fig. 5 represents a hook which takes up the arm in the locking position. Fig. 6 is a side view of the lock attached to the front fork of a bicycle in open position. Fig. 7 is the corresponding front view showing the lock in closed position.

According as the locking-arm is to engage with the spokes of the front or rear wheel the lock can be fastened to the front or rear fork. In the former case I secure to the right-hand arm of the front fork a collar $a$, the eyes $a'$ and $a^2$ of which serve as a guide to a spindle $c$. Upon this spindle $c$ I provide and connect in a suitable manner an arm $l$, which by being turned can be caused to engage, by means of its wedge-shaped projection $i$, with the recesses $k$ and $k'$, arranged at right angles to each other. The recess $k'$ is formed in a lug $a^3$, arranged laterally on the eye $a'$, while the recess $k$ is turned to the front and is likewise provided with a wedge surface. A spiral spring $o$, which is fixed with its upper end in that part of the arm $l$ which is secured to the spindle $c$ and with its lower end in the bracket $a^2$, continually tends to force the projection $i$ upward and into the recess $k$ or $k'$, according to its position, while it causes the spindle $c$, in the turning movement of the latter, to move back to its position of rest. This turning movement of the spindle $c$ through an angle of ninety degrees is effected by a handle $d$, arranged at the upper end of the same, and has for its object to bring the arm $l$ to the position of the recess $k$ or $k'$.

The mode of operation would therefore be as follows: On turning the handle $d$ through an angle of ninety degrees the two wedge faces of the recess $k$ and of the projection $i$ cause this projection to leave the recess $k$ and after the turning movement to snap into the recess $k$ with the coöperation of the spring $o$, the arm $l$ occupying a place between the spokes of the front wheel and preventing the turning movement of the said front wheel. In this movement of the spindle $c$ with the arm $l$ the spring $o$ is put in tension. When the handle $d$ is now pressed down, the projection $i$ will leave the recess $k'$ and the spring $o$ will automatically move the arm $l$ to the position corresponding to the recess $k$, Figs. 2 and 6, so that the movement of the front wheel is not interfered with.

In order that the spindle $c$ may not be pressed down by an unauthorized person for the purpose of liberating the wheel, a lock $f$ is arranged on the spindle $c$, in which lock is provided a bar $e'$, adapted to be operated by the handle $e$. This bar, as soon as the arm $l$ occupies the locking position, is pressed down so that it strikes against the eye $a'$ and is held in this position by any desired locking mechanism which can be released only by the key in the possession of the cyclist.

In order to obviate the breakage of the arm $l$ in the locking position, it is advantageous to fix to the left-hand prong of the fork a hook $m$, adapted to receive the arm $l$, as shown in Figs. 5 and 7. In like manner the fixing, instead of being effected by collars, may take place by soldering and the lock may be provided with a guard-plate for protecting it against dust.

Having now particularly described and ascertained the nature of my said invention and in what manner the same is to be performed, I declare that what I claim is—

A bicycle-lock comprising the bracket or frame adapted to be secured to the cycle, the spring-pressed rock-shaft, an arm carried thereby adapted to swing in between the spokes of the cycle-wheel when the rock-shaft is turned, a projection on said arm adapted to enter a recess in said frame to hold the arm in its locking position, and means movable on the rock-shaft for preventing the removal of the projection from the recess by unauthorized persons, the said frame having also a second recess $k'$ with a beveled face to coact with the beveled face of the projection, substantially as described.

In witness whereof I have hereunto set my hand in presence of two witnesses.

ERNST FRANZKE.

Witnesses:
HERM. HILDEBRANDT,
THEODOR BLUMENTHAL.